United States Patent [19]

Gold

[11] Patent Number: 4,958,884

[45] Date of Patent: Sep. 25, 1990

[54] VEHICLE SAFETY BAR ASSEMBLY

[76] Inventor: Peter N. Gold, 465 N. Wood Rd., Rockville Centre, N.Y. 11570

[21] Appl. No.: 417,917

[22] Filed: Oct. 6, 1989

[51] Int. Cl.$^5$ .............................................. B62D 31/00
[52] U.S. Cl. ................................... 296/188; 296/146; 49/502
[58] Field of Search ....................... 296/188, 146, 189; 49/502

[56] References Cited

U.S. PATENT DOCUMENTS

| | | | |
|---|---|---|---|
| 3,868,141 | 2/1975 | Johnson | 296/189 |
| 4,090,734 | 5/1978 | Inami et al. | 296/146 |
| 4,684,166 | 8/1987 | Kanodia | 296/146 |
| 4,702,040 | 10/1987 | Hellriegel | 49/502 |
| 4,711,052 | 12/1987 | Maeda et al. | 49/502 |
| 4,861,097 | 8/1989 | Wycech | 296/188 |
| 4,866,883 | 9/1989 | Brown et al. | 49/502 |

Primary Examiner—Robert R. Song

[57] ABSTRACT

An impact-absorbing vehicle safety bar assembly, mountable within the cavity of a vehicle panel includes a resilient, generally curvilinear bar having two opposite ends, which is outwardly bowed with respect to the vehicle interior. Upon impact, the bar tends to deform from its normally bowed condition to a flattened condition, as a result of which its ends are pressed against the sidewalls of the vehicle panel and, in turn, the vehicle pillars, thereby transferring the external impact load laterally towards its ends and, in turn, to the vehicle panel and pillars. This serves to strengthen the vehicle panel and summarize the possibility of inward implosion or caving in of the panel and concomitant harm to the vehicle occupants.

11 Claims, 2 Drawing Sheets

VEHICLE SAFETY BAR ASSEMBLY

BACKGROUND OF THE INVENTION

The present invention relates to a vehicle safety bar assembly. More particularly, the invention relates to an impact-absorbing vehicle safety bar assembly mountable within the cavity of a vehicle door or panel.

Unfortunately, it is not an unusual occurrence for vehicle passengers to be killed or injured as a result of a side or a rear impact by another vehicle. As a result of a variety of reasons, including federal fuel economy standards, cost factor, etc., vehicle chassis and doors are made from extremely thin gauge metal. Indeed, it is not unusual today to be able to actually bend the metal of the vehicle door simply by pressing your thumb against it. In fact, a typical galvanized garbage can uses thicker metal to resist impact loads than most vehicles made today.

As a result, many vehicle manufacturers have voluntarily added internal side strengthening devices (see, for example, the additional lateral support 19 shown in FIG. 1 of U.S. pending application Ser. No. 365,251 entitled "AUTOMOTIVE WINDOW MOUNTING SYSTEM"). These internal strengthening devices add strength to the outer sheet metal to protect it from denting and to also possibly assist in preventing side or rear impact collisions from causing injury to the occupants of the vehicle. Other vehicle manufacturers simply add a steel pipe inside the vehicle door, paralleling the outer door skin, so as to provide side impact crash protection. However, the problem with the use of a bar or any typical side strengthening device is that upon a strong lateral force, it simply implodes or caves inwardly and it is often insufficient to prevent injury to the occupants.

SUMMARY OF THE INVENTION

Accordingly, it is an object of the present invention to provide an impact-absorbing vehicle safety bar assembly mountable within the cavity of a vehicle door which serves to resist imploding forces and provides improved occupant safety.

IT is a further object of the present invention to provide such a vehicle safety bar which is relatively inexpensive to manufacture and install and which is of a relatively simple design.

It is a more particular object of the present invention to provide such a novel safety bar having the foregoing attributes and characteristics which is specifically intended to transfer the external impact loads laterally so as to be absorbed by the car vehicle pillars.

Certain of the foregoing and related objects are attained according to the invention by the provision of an impact-absorbing vehicle safety bar assembly, mountable within vehicle door panel of the type comprising an outer wall and an inner wall connected via a pair of spaced-apart sidewalls to define an internal cavity which panel is supported between a pair of car pillars. The assembly includes a generally normally-bowed, resilient, curvilinear bar having two opposite ends, means for mounting the bar within the vehicle panel cavity so that it horizontally spans the panel cavity of and is outwardly bowed with respect to the vehicle interior. Upon impact, the bar tends to deform from its normally bowed condition to a flattened condition, as a result of which its ends are pressed against the sidewalls of the vehicle panel and, in turn, the vehicle pillars, thereby transferring the external impact load laterally towards its ends and, in turn, to the vehicle panel sidewalls and pillars.

Preferably, the curvilinear bar has two longitudinally spaced-apart reinforcement holes formed therethrough and the assembly additionally includes a reinforcement member, disposed inwardly of the curvilinear bar and having opposite ends received in a respective opposite reinforcement hole of the curvilinear bar. The reinforcement member serves, upon impact, to reinforce the curvilinear bar and maintain it in its normal bowed condition. Most desirably, the reinforcement member additionally has a rubber spacer mounted thereon for maintaining the curvilinear bar in a spaced relationship thereto. Advantageously, the reinforcement member has bent ends and one of the reinforcement holes is elongated to allow for easy mounting of the reinforcement member on the curvilinear bar. The reinforcement member preferably has a generally C-shaped rod.

The curvilinear bar is preferably made from spring steel and is generally U-shaped. It is also desirable for the means for mounting to include bolt means.

In a preferred embodiment of the invention, the ends of the curvilinear bar are bent to extend generally normally to the curvilinear bar and "at least one" of the bent ends is spaced from the vertical wall of the vehicle door in its normal position. Upon impact, as the curvilinear bar is deformed from its normally bowed condition to a flattened condition, the at least one end is pressed against the vertical sidewall of the panel and, in turn, the car pillar. The "at least one" end advantageously has an abutment member mounted thereon receivable within a through-hole of the vertical sidewall of the door which, upon impact, is pressed directly against the car pillar. The abutment member is preferably secured to the "at least one" end by the mounting means.

BRIEF DESCRIPTION OF THE DRAWINGS

Other objects and features of the present invention will become apparent from the detailed description considered in connection with the accompanying drawings, which disclose one embodiment of the invention. It is to be understood that the drawings are to be used for the purpose of illustration only and not as definition of the limits of the invention.

In the drawings, wherein similar reference characters denote similar elements throughout the several views.

DETAILED DESCRIPTION OF THE PREFERRED EMBODIMENT

Figure 1:
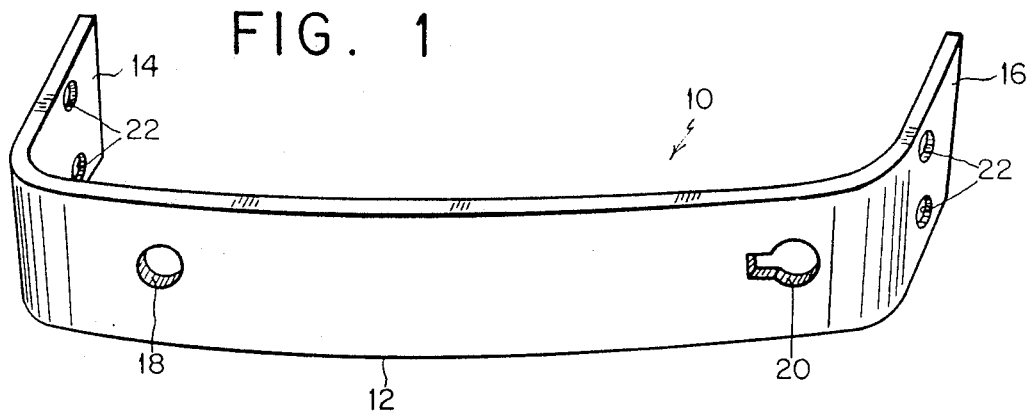
FIG. 1 is a perspective view of the curvilinear crash bar used in the safety bar assembly of the present invention.

Turning now in detail to the drawings, and in particular FIG. 1 thereof, therein illustrated is a curvilinear spring steel bar used in the safety bar assembly of the present invention, generally designated by reference numeral 10. Bar 10 has a generally U-shaped configuration and includes a generally outwardly bowed, generally planar main panel 12 and two opposite bent ends 14, 16 disposed generally perpendicularly with respect to main panel 12. Main panel 12 has two horizontally spaced-apart reinforcement holes 18, 20 formed therein, the latter one of which is in the form of a key slot. Bent ends 14 and 16 each have a pair of vertically spaced-apart bolt holes 22 formed therethrough.

Figure 2:
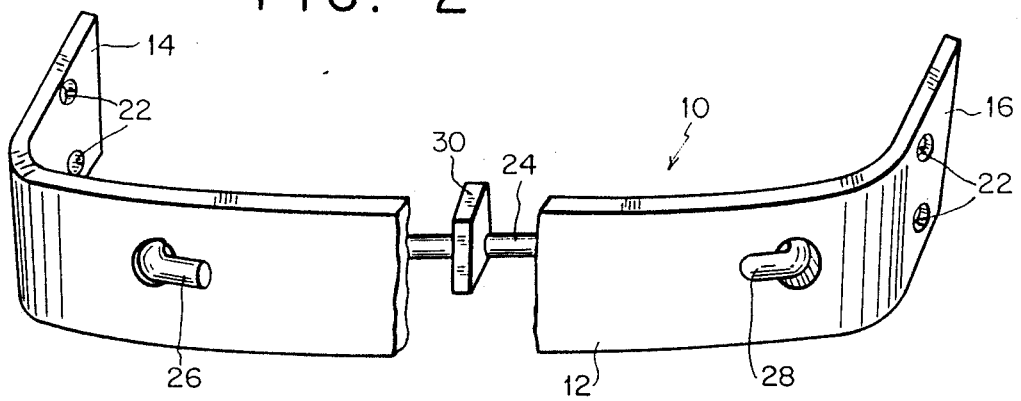
FIG. 2 is a fragmentarily-illustrated perspective view of the curvilinear crash bar shown in FIG. 1 with a reinforcement bar incorporated therein.

FIG. 2 shows the placement of an elongated generally C-shaped reinforcement rod 24, having two bent ends 26, 28, received in reinforcement holes 18, 20, respectively. The bent ends 26 and 28 of reinforcement bar 24, can be bent to the degree shown in FIG. 2, when installed, or the holes may be appropriately dimensioned to allow for insertion in a pre-bent condition. In either event, a rubber spacer 30 is preferably mounted on rod 24 to maintain bar 10 and rod 24 in a normally spaced-apart relation with respect to one another and to also reinforce the normally bowed condition of bar 10.

Figure 3:
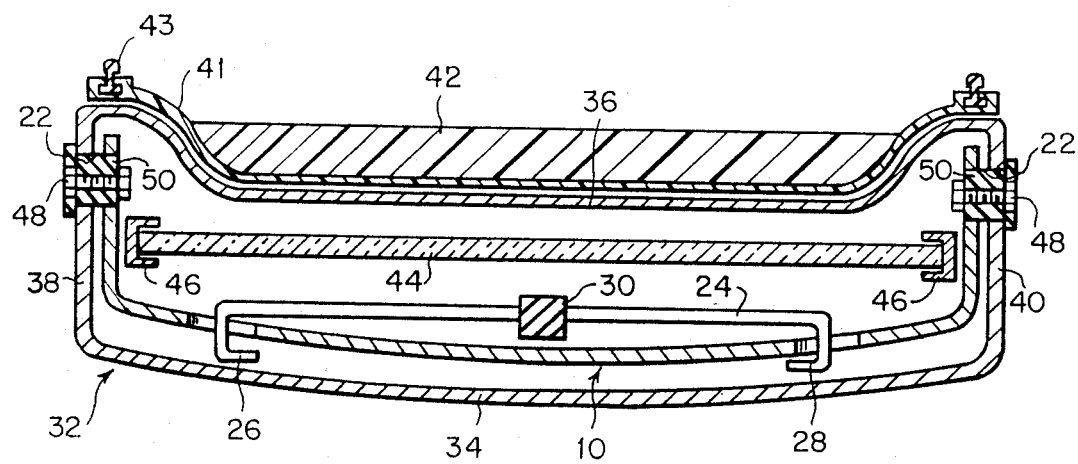
FIG. 3 is a horizontal sectional view taken through the safety bar assembly of the present invention, as mounted in a vehicle door.

FIG. 3 illustrates the safety bar 10 mounted within a hollow vehicle car door or body panel, generally designated 32, which includes an outer door panel 34, an inner door panel 36, which are interconnected by two side panels or sidewalls 41, 40. Secured to the inner door panel 36 is the vehicle trim pad 38, having a peripheral channel in which a composite weatherstrip door seal 43 is mounted. Vehicle trim pad 41 also has an arm rest 42 incorporated therein. Within the hollow center portion of door 32, the vehicle door glass 44 is mounted within the door window run channels 46, the construction of which is well known to those skilled in the art.

The safety bar of the present invention is mounted within the hollow cavity of door 32 via bolts 48 received in bolt holes 22. Bolts 48 each have a spacer plug 50 mounted thereon, which are received within holes 22 in the side panels 38, 40 and are dimensioned to support the bent ends 14, 16 at a slight distance from side panels 38, 40, the purpose for which will be described in greater detail hereinafter.

Figure 4:
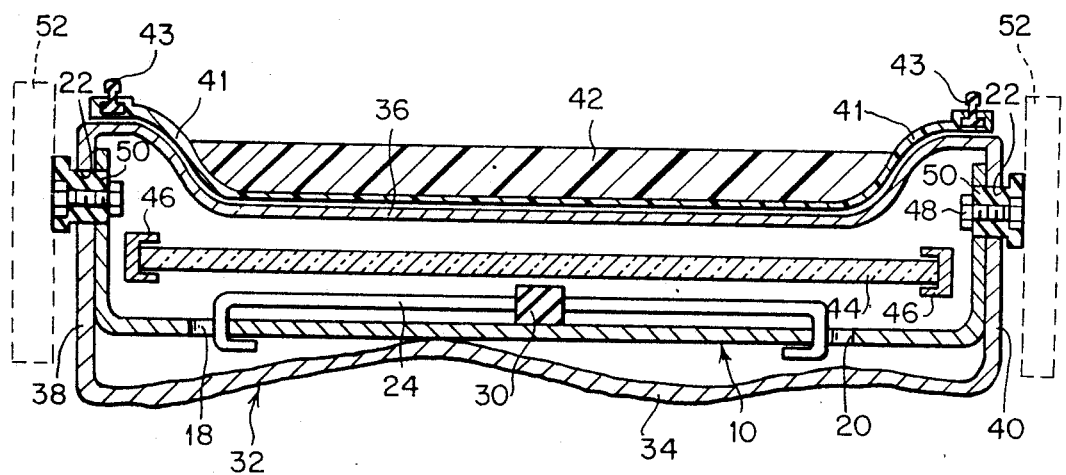
FIG. 4 is a view similar to that of FIG. 3, but showing the same after a side impact.

FIG. 4 illustrates a typical position of the safety bar and door assembly following a side impact on front panel 32, as caused by another vehicle. As can be seen therein, the front panel 34 is pushed inwardly, causing the normally outwardly bowed main panel 12 of curvilinear bar 10 to be pressed inwardly to assume a generally flattened condition. The reinforcement bar 24 serves to resist further inward bowing or collapse of curvilinear bar 12 by adding additional structural strength to main panel 12 and by maintaining a spaced relationship thereto via spacer 30; note, the key-shape configuration of hole 20 and the spacing thereof in relation to hole 18 is dimensioned to accommodate the flattening of rod 10, as can be seen by the comparison of FIGS. 3 and 4.

At the same time that main panel 12 is flattened, the bent ends 14 and 16 are, in turn, moved outwardly so that they press against the vertical sidewalls 38, 40 of door panel 32. This, in turn, causes the spacer collars 50 to press against the vehicle pillars 52, thereby transferring the impact load laterally and causing it to be absorbed by the car pillars 52 which have significantly greater structural strength than the vehicle door or panel per se. This, in turn, serves to reinforce the safety bar as it is now braced between the two car pillars, thereby preventing further inward collapse or implosion of the vehicle door or body panel. As can be appreciated, the utilization of the car pillars to absorb the impact loads does not require any further structural reinforcement to the car chassis.

Figure 5:
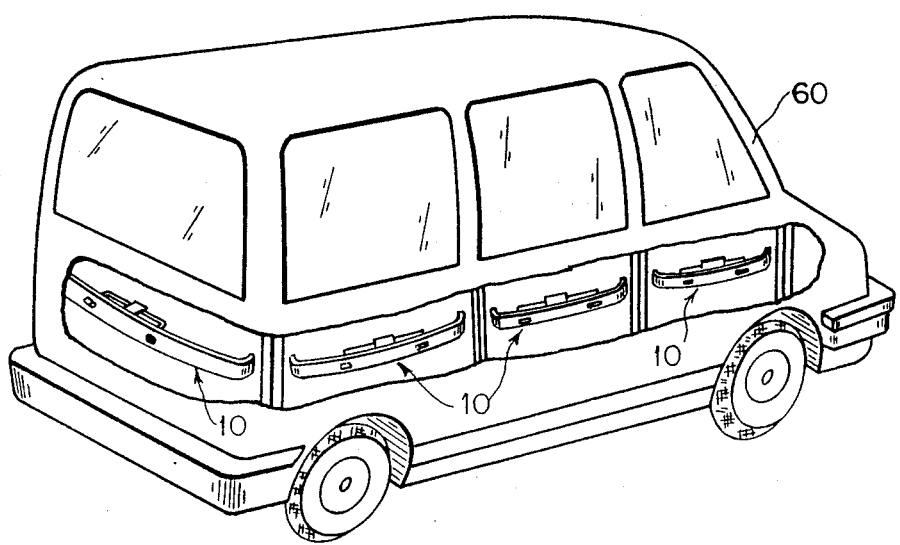
FIG. 5 is a schematic view showing the vehicle safety bar mounted in the side and rear door and body panels of a vehicle.

As can be seen in FIG. 5, the safety bar assembly of the present invention could be inserted in each of the body and door panels of a vehicle 60, both in the side and rear thereof, and would be typically mounted at a height equivalent to the vehicle belt line.

As can be appreciated, use of the inventive safety bar does not require the employment of rigid "I" beams or rods previously used, which take up significant space. Therefore, it actually makes it possible to reduce the amount of interior door space within a vehicle door to provide more room in the interior of the vehicle for "living space". In addition, the present invention tends to reduce the instant shock load of a side or rear impact collision by relatively gradually transferring the impact load to lateral loads, while at the same time adding additional protection to these vehicle occupants.

Various modifications may be made, as will be apparent to those skilled in the art. For example, although the safety bar assembly is especially intended for employment in a vehicle door, it could be mounted in a non-movable vehicle body panel, as well. In addition, although it is preferable to have both ends of the curvilinear bar spaced from the vertical sidewalls of the door, it is possible that one could be fixed in close abutment thereto, such as on the side of the door panel, coupled to the door hinge which, in turn, is affixed to the chassis or car pillar. In this case, the impact load would be transferred from the safety bar to the door side panel, to the door hinge and, in turn, the car pillar.

Accordingly, while only one embodiment of the present invention has been shown and described, it is obvious that many changes and modifications may be made thereunto without departing from the spirit and scope of the invention.

What is claimed is:

1. An impact-absorbing vehicle safety bar assembly, mountable within a vehicle panel of the type comprising an outer wall and an inner wall connected via a pair of spaced-apart sidewalls to define an internal cavity which panel is supported between a pair of car pillars, comprising:

a generally normally-bowed, resilient, curvilinear bar having two opposite ends; and means for mounting said bar within the vehicle panel cavity so that it horizontally spans the cavity of said panel and is outwardly bowed with respect to the vehicle interior whereby, upon impact, said bar tends to deform from its normally bowed condition to a flattened condition, as a result of which its ends are pressed against the sidewalls of the vehicle panel and, in turn, the vehicle pillar, thereby transferring the external impact load laterally towards its ends and, in turn, to said vehicle panel sidewalls and pillars.

2. The assembly of claim 1, wherein said curvilinear bar has two longitudinally spaced-apart reinforcement holes formed therethrough and wherein said assembly additionally includes a reinforcement member, disposed inwardly of said curvilinear bar and having opposite ends received in a respective opposite reinforcement hole of said curvilinear bar, which reinforcement member serves, upon impact, to reinforce the curvilinear bar and maintain it in its normal bowed condition.

3. The assembly of claim 2, wherein said reinforcement member additionally has a rubber spacer mounted thereon for maintaining the curvilinear bar in a spaced relationship thereto.

4. The assembly of claim 2, wherein said reinforcement member has bent ends and wherein one of said reinforcement holes is elongated to allow for easy mounting of said reinforcement member on said curvilinear bar.

5. The assembly of claim 2, wherein said curvilinear bar is made from spring steel.

6. The assembly of claim 1, wherein said means for mounting includes bolt means.

7. The assembly of claim 1, wherein the ends of said curvilinear bar are bent to extend generally normally to said curvilinear bar and at least one of said bent ends is spaced from the side wall of said vehicle in its normal position so that, upon impact, as said curvilinear bar is deformed from its normally bowed condition to a flattened condition, said at least one end is pressed against the sidewall of said panel and, in turn, the car pillar.

8. The assembly of claim 7, wherein said sidewall has a through-hole of said bar and wherein at least one end has an abutment member mounted thereon receivable within said through-hole of said sidewall which, upon impact, is pressed directly against the car pillar.

9. The assembly of claim 8, wherein said abutment member is secured to said at least one end of said bar by said mounting means.

10. The assembly of claim 1, wherein said curvilinear rod is generally U-shaped.

11. The assembly of claim 2, wherein said reinforcement member is a generally C-shaped rod.

* * * * *